United States Patent [19]

Ashiba et al.

[11] Patent Number: 4,689,589
[45] Date of Patent: Aug. 25, 1987

[54] ELECTROMAGNETICALLY ACTUATED ROTARY ACTUATOR CONTROLLED BY A POWER SOURCE SWITCH

[75] Inventors: Masahiro Ashiba, Tokyo; Takashi Shirakuma, Kanagawa, both of Japan

[73] Assignee: Tokico Ltd., Kanagawa, Japan

[21] Appl. No.: 786,306

[22] Filed: Oct. 10, 1985

[30] Foreign Application Priority Data

Oct. 19, 1984 [JP] Japan ............................ 59-158035[U]

[51] Int. Cl.⁴ ........................ H01F 7/08; H01H 67/02
[52] U.S. Cl. ..................................... 335/272; 335/125
[58] Field of Search ................ 340/644; 335/114, 118, 335/125, 185–187, 200, 272, 276; 307/112, 115, 139, 140; 200/11 D, 11 DA

[56] References Cited

U.S. PATENT DOCUMENTS 3,233,066 2/1966 Stoddard et al. ............... 335/118 X
3,372,254 3/1968 Burch et al. ..................... 335/125 X

*Primary Examiner*—J. R. Scott
*Attorney, Agent, or Firm*—Wenderoth, Lind & Ponack

[57] ABSTRACT

A rotary actuator has a casing; a rotor rotatably provided in the casing; an exciting coil mounted on the rotor; a magnetic pole member provided in the casing which surrounds the rotor; first, second and third contact elements mounted on the rotor and electrically coupled to opposite end terminals and an intermediate terminal of the coil respectively; first and second stops provided in the casing and cooperating with the rotor to restrict the rotation thereof over a predetermined angular range; fourth, fifth and sixth contact elements mounted on the casing to cooperate respectively with the first, second and third contact elements such that the sixth contact element permanently contacts the third contact element, that the fourth contact element contacts the first contact element except when the rotor engages and is adjacent to the first stop and that the fifth contact element contacts the second contact element except when the rotor engages and is adjacent to the second stop; and a switch for applying electric power to the sixth contact element and selectively to the fourth and fifth contact elements. An indicating device is connected to the switch to indicate whether the rotor is at a first position engaging the first stop or at a second position engaging the second stop.

5 Claims, 7 Drawing Figures

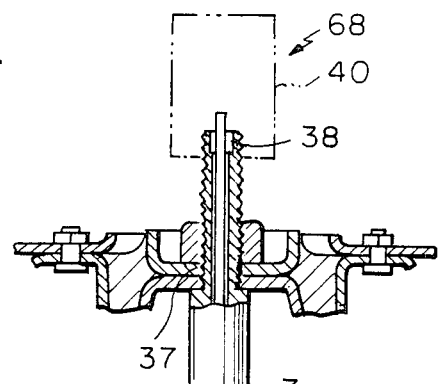
Fig. 6
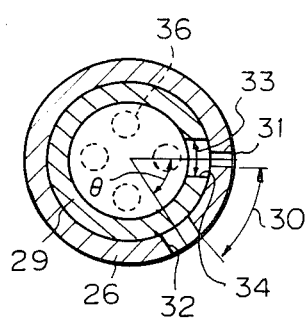
Fig. 7
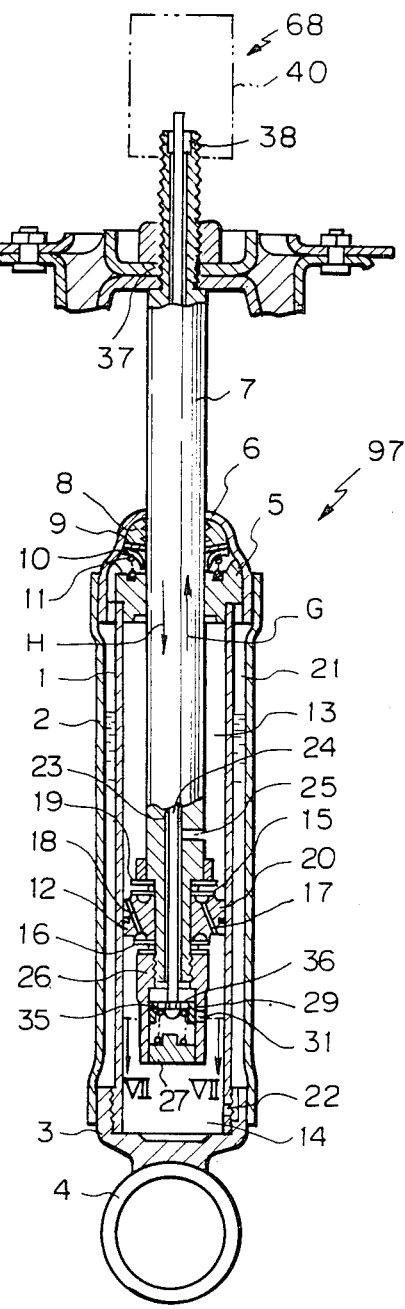

ELECTROMAGNETICALLY ACTUATED ROTARY ACTUATOR CONTROLLED BY A POWER SOURCE SWITCH

BACKGROUND OF THE INVENTION

This invention relates to a rotary actuator for rotating an object reciprocatingly over a limited angular range. The rotary actuator is adapted for use in a hydraulic damper of are adjustable damping force type, however, it is not limited to such a particular appliance.

SUMMARY OF THE INVENTION

The hydraulic damper of adjustable damping force type is widely used in a vehicle such as an automobile and enables a change in the damping force characteristics in response to the condition of the surface of the road or the operating condition of the vehicle to improve the comfortableness in driving the vehicle and to improve the steering property. Such a hydraulic damper usually includes a rotatable adjusting member driven by a rotary actuator.

It is required that the rotary actuator can reliably locate the rotatable adjusting member at predetermined angular positions and, further, that an indicator is provided to indicate to the driver of the vehicle that the adjusting member is located at desired angular positions.

The present invention has been made in view of aforesaid circumstances and set faith a rotary actuator comprising a casing, a rotor rotatably provided in the casing, an exciting coil mounted on the rotor, a magnetic pole member provided in the casing and surrounding the rotor, first, second and third contact elements mounted on the rotor and connected electrically to opposite ends and an intermediate terminal of said coil respectively, first and second stops provided on the casing and cooperating with the rotor to restrict the rotation thereof in the first and second directions respectively, a fourth contact element provided on the casing to contact the first contact element when the rotation of the rotor in the first direction is stopped by the first stop and not to contact therewith when the rotation of the rotor is stopped by the second stop, a fifth contact element provided on the casing and cooperating with the second contact element to contact with the second contact element when the rotation of the rotor is stopped by the second stop and not to contact with the second contact element when the rotation of the rotor is stopped by the first stop, a sixth contact element provided on the casing and cooperating with the third contact element to contact therewith during the rotation of the rotor, a switch for selectively applying electric power between the sixth contact element and fourth and fifth contact elements, and indicating means connected in parallel with said switch to indicate whether the rotor is at a first position engaging the first stop or at a second position engaging the second stop.

BRIEF DESCRIPTION OF THE DRAWINGS

Further objects and advantages of the invention will become apparent from the following detailed description of one preferred embodiment of the invention exemplified in accompanying drawings, in which;

FIG. 6 is a longitudinal sectional view of a hydraulic damper of adjustable damping force type to which the rotary actuator of FIG. 1 is adapted to be incorporated; and FIG. 7 is a sectional view taken along line VII—VII in FIG. 6.

DETAILED DESCRIPTION OF THE PREFERRED EMBODIMENTS

Figure 1:
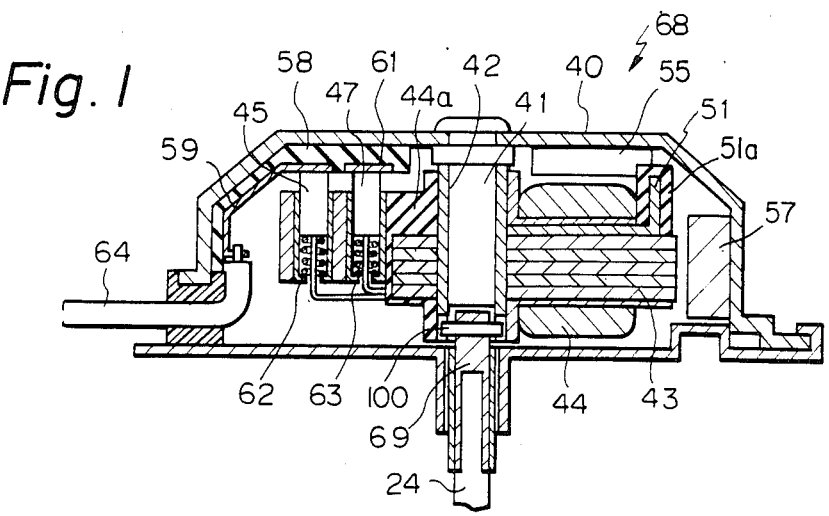
FIG. 1 is a longitudinal sectional view of a rotary actuator according to the present invention.

FIGS. 6 and 7 show one example of a hydraulic damper 97 of adjustable damping force type adapted for use with the rotary actuator according to the invention. The hydraulic damper 97 comprises an inner tube 1 acting as a cylinder, a co-axial outer tube 2 surrounding the inner tube 1, a cap 3 secured to one end of the inner and outer tubes 1 and 2, and a mounting ring 4 integrally connected to the cap 3 for mounting the hydraulic damper 97 on a wheel axle or the like of a vehicle. A rod guide 5 and a cap 6 are respectively fitted on the other ends of the inner and outer tubes 1 and 2. A piston rod 7 extends through the rod guide 5 and the cap 6. The piston rod 7 may be secured to a bracket member 37 of a vehicle, for example. An annular packing 8 is disposed on the inner side of the cap 6 and engages sealingly and slidably with the piston rod 7. A retainer 9, an annular check valve 10 and a spring 11 are disposed between the packing 8 and the rod guide 5 and surround the piston rod 7. The check valve 10 cooperates with the rod guide 5 to permit fluid flow only in the radially outward direction.

A piston 12 is secured to the inner end of the piston rod 7 and partitions the interior of the inner tube 1 into two liquid chambers 13 and 14. Annular disc valves 15 and 16 are mounted on opposite sides of the piston 12 to cooperate respectively with passages 17 and 18 which extend respectively through the piston 12. The disc valves 15 and 16 are normally closed and open respectively during the downward and upward movement of the piston 12, or act as one way valves respectively. To place liquid chambers 13 and 14 in communication permanently, there is provided a fixed orifice branched from either of passages 17 and 18. Shown at 19 and 20 in FIG. 6 are a washer and a piston ring respectively.

The disc valve 15 opens when the pressure in the chamber 14 is higher than the pressure in the chamber 13 by a predetermined level, and permits the liquid flow from the chamber 14 to the chamber 13 through the passages 17. The disc valve 15 closes when the pressure difference between the chambers 14 and 13 is decreased below the predetermined level to prevent the liquid flow from the chamber 14 to the chamber 13 through the passages 17. The disc valve 16 opens only when the pressure difference between chambers 13 and 14 is larger than a predetermined level.

A annular chamber 21 defined between the inner tube 1 and the outer tube 2 permanently communicates with the chamber 14 through an opening 22 which is formed in the lower end portion of the inner tube 1. The chambers 13 and 14 and the lower portion of the chamber 21 receive therein hydraulic liquid, and the chamber 21 receives in the upper portion thereof pressurized gas such as inert gas.

A through bore 23 is formed coaxially in the piston rod 7, and a shaft 24 rotatably extends through the bore 23. The diameters of the bore 23 and the shaft 24 define an annular space therebetween having a sufficiently large passage area. A radial hole 25 is formed in the piston rod 7 to place the liquid chamber 13 in communication with the bore 23.

A tubular member 26 is threaded to the lower end of the piston rod 7 to act as a nut connecting the piston rod 7 with the piston 12, the disc valves 15 and 16, and related parts. A cap 27 is secured to the lower end of the tubular member 26.

A shutter 29 acting as a passage area adjusting member is secured to the lower end of the shaft 24. As shown in FIG. 7, there are formed in the peripheral wall of the tubular member 26 radial holes 31 and 32 of different diameters. A radial hole or cutout 34 is formed in the peripheral wall of the shutter 29, whereby, when the shutter 29 is rotated in the tubular member 26, radial holes 31 and 32 are selectively opened or closed by the hole or cutout 34 in the shutter 29. The radial holes 31 and 32 are spaced from each other by a predetermined angle $\theta$, and the diameter of radial hole 32 is larger than that of the radial hole 31. The angle $\theta$ is about 60 degrees. The hole or cutout 34 in the shutter 29 has a predetermined width 33 which is smaller than the space 30 between the holes 31 and 32 and is larger than the diameter of the hole 32. A spring 35 is disposed between the cap 27 and the shutter 29 to bias the shutter 29 in the upward direction. Axial holes 36 are formed in the shutter 29 and, the effective passage area of axial holes 36 is larger than that of the hole or cutout 34. Thus, the radial hole 25, annular space between the bore 23 and the shaft 24, axial holes 36, the hole or cutout 34, and either of radial holes 31 and 32 constitute a liquid passage connecting liquid chambers 13 and 14.

Figure 2:
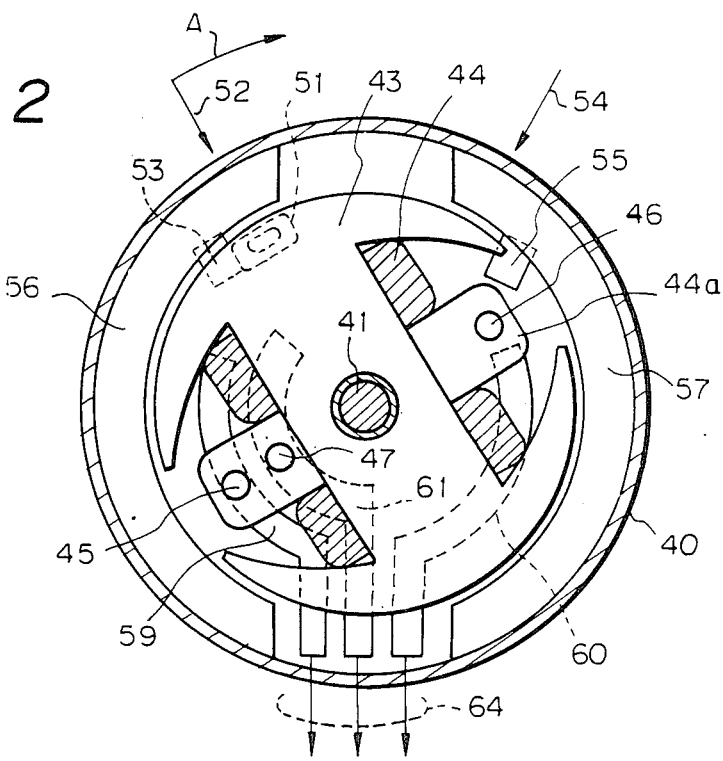
FIGS. 2 and 3 are explanatory views as viewed from the bottom side of FIG. 1.
Figure 3:
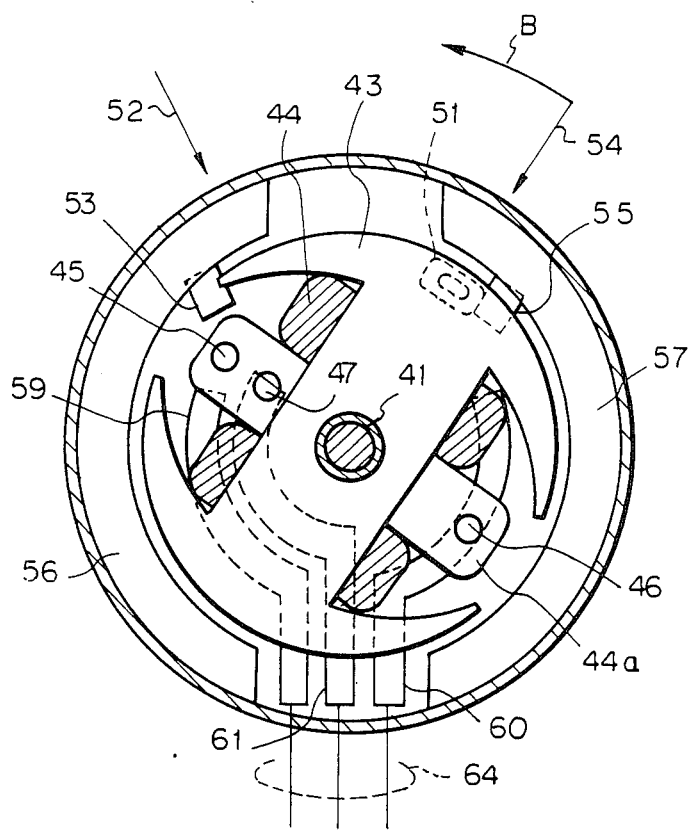
Figure 4:
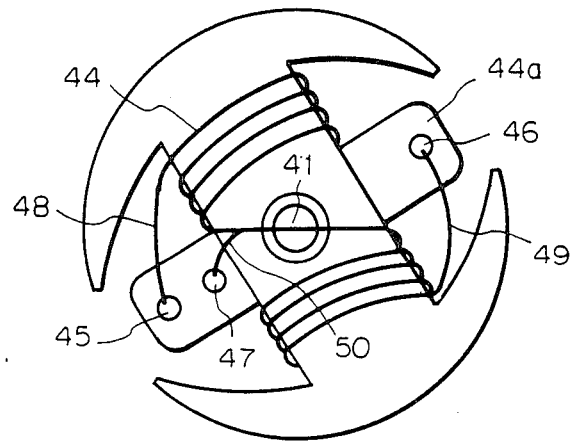
FIG. 4 is an explanatory view of a rotor of the rotary actuator of FIG. 1.

The upper end of the shaft 24 which sealingly extends through the bore 23 through a seal ring 38 is connected to a rotary actuator 68 according to the invention as described hereinafter with reference to FIGS. 1-5. A casing 40 of the rotary actuator 68 is mounted on the upper end of the piston rod 7. A stationary shaft 41 is mounted in the casing 40. A sleeve 42 is mounted around the shaft 41 so as to be rotatable relative thereto. A rotor 43 formed of laminated steel plates is mounted on the rotatable sleeve 42 to rotate in the direction indicated by arrow A and arrow B (FIGS. 2 and 3). A coil 44 is mounted on the rotor 43. A contact element mounting member 44a is mounted on the rotor 43 to rotate therewith and mounts thereon contact elements 45, 46 and 47 in the form of spring-biased brushes. The contact element 45 is connected electrically to one end 48 of the coil 44, the contact element 46 is connected electrically to the other end 49 of the coil 44 and the contact element 47 is connected to an intermediate terminal 50 of the coil 44 as shown clearly in FIG. 4. The mounting member 44a is formed of electrically insulating material. A projection 51 is fixedly mounted on the rotor 43 to act as an abutting member and is covered by resilient material 51a such as rubber. When the rotor 43 rotates to a position 52 (FIG. 2) the projection 51 abuts with a projection 53, which is mounted on the casing 40 to act as an abutting member. And when the rotor 43 rotates to a position 54 (FIG. 3) the projection 51 abuts with another projection 55, which is also mounted on the casing 40 to act as an abutting member. Upon rotation of the rotor 43 in the direction indicated by arrow B, the projection 51 abuts with the projection 53 to restrict further rotation of the rotor 43 in that direction.

There are mounted on the inside surface of the casing 40 magnetic pole members 56 and 57 formed of permanent magnets. The pole members 56 and 57 are opposingly arranged to constitute N-pole and S-pole respectively with respect to the rotor 43. There are provided on the inner surface of the casing 40 contact elements 59, 60 and 61 in the form of arcuate slip rings which cooperate respectively with contact elements 45, 46 and 47. An electrically insulating material 58 is interposed between the casing 40 and contact elements 59, 60 and 61. The contact element 59 extends along the rotational direction of the contact element 45 to normally contact therewith, but not to contact with the contact element 45 when the rotor 43 is located at position 54 (FIG. 3). The contact element 60 extends along the rotational direction of the contact element 46 to normally contact therewith, but not to contact with the contact element 46 when the rotor 43 is located at position 52 (FIG. 2). The contact element 61 extends along the rotational direction of the contact element 47 to permanently contact therewith during the rotation of the rotor 43 between positions 52 and 54. The contact elements 45, 46 and 47 are biased by respective springs 62 and 63 (the spring for the contact element 47 is not shown in the drawings) toward respective contact elements 59, 60 and 61. The contact elements 59, 60 and 61 are connected through cables 64 to a switch 65 and an electric source 66. The switch 65 is mounted on, for example, an operating panel in a driver's compartment of the vehicle to which the hydraulic damper is mounted. The rotor 43 is connected to an output shaft 69 of the rotary actuator 68 through a pin 100, and the output shaft 69 is connected to the shaft 24 of the hydraulic damper 97.

The switch 65 is connected in parallel to a series circuit consisting of a light emitting diode (LED) 70 and a resistor 71 and a series circuit consisting of an LED 72 and a resistor 73. The LED 70 and 72 are also mounted on the operating panel in the driver's compartment so as to be observed by the driver of the vehicle. The contact elements 45, 46, 47, 59, 60 and 61 constitute respective first, second, third, fourth, fifth and sixth contact elements according to the invention, and series circuits (LED 70 and 72, and resistors 71 and 73) constitute indicating means according to the invention.

Figure 5:
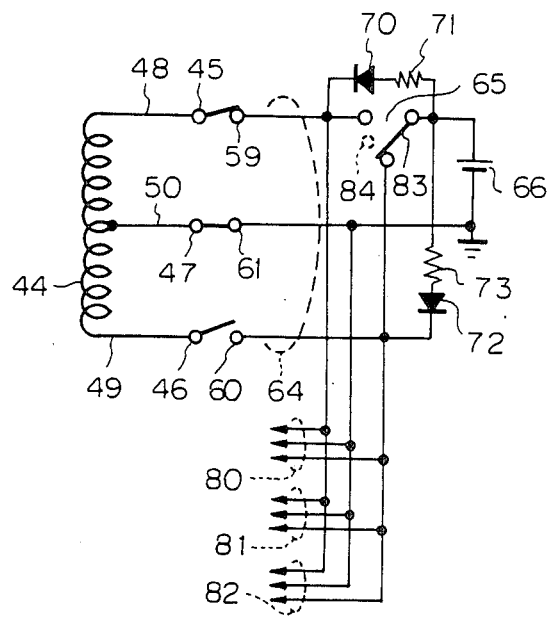
FIG. 5 is an electrical circuit diagram of the rotary actuator of FIG. 1.

In operation, when the switch 65, as shown in FIG. 5, applies the voltage of the electric source 66 between contact elements 60 and 61 and not between contact elements 59 and 61, the rotor 43 is rotated to position 52 as shown in FIG. 2, whereby the shutter 29 is rotated to the position as shown in FIG. 7 whereat hole 34 aligns with hole 31. The chambers 13 and 14 in the hydraulic damper 97 communicate through radial hole 25, the bore 23, the holes 36, the hole 34 and the hole or orifice 31. The hydraulic damper generates a damping force in the extension stroke or during the displacement of the piston 12 in the direction indicated by arrow G (FIG. 6) as defined by the hole 31, the fixed orifice in the piston 12 and the disc valve 16, and a damping force in the contraction stroke or during the displacement of the piston in the direction indicated by arrow H (FIG. 6) as defined by the hole 31, the fixed orifice in the piston 12 and the disc valve 15. The diameter of the hole 31 is smaller than that of the hole 32, thus the damping forces in this case are large or the damper is at a hard condition. Further, the contact elements 46 and 60 do not contact and the voltage on opposite ends of the series circuit consisting of LED 72 and the resistor 73 are equal, thus, LED 72 does not emit light, while, electric current proportional to the resistance offered by resistor 71 is applied to LED 70 which emits light to indicate that the rotor 43 is located at position 52 or that the hydraulic damper 97 is set to the hard condition.

When the switch 65 is switched to apply the voltage of the electric source 66 between contact elements 59 and 61 and not between contact elements 60 and 61, an electric current flows through contact elements 59 and 45, terminal 48, coil 44, terminal 50 and contacting elements 47 and 61, thus the rotor 43 is excited to rotate in the direction indicated by arrow A. In the early stage of the rotation the contact element 46 contacts the contact element 60. In the last stage of the rotation the contact between contact elements 45 and 59 is released which interrupts the supply of electric current to the coil 44. Thereafter, the rotor 43 is further rotated by its inertia until the projection 51 engages with the projection 55. The shaft 24 and the shutter 29 in the damper 97 are rotated together by the rotor 43. At the condition shown in FIG. 3, the hole 34 aligns with the hole 32. The chambers 13 and 14 in the hydraulic damper 97 communicate through radial hole 25, the bore 23, the holes 36, the hole 34 and the hole 32. The hydraulic damper generates a damping force in the extension stroke as defined by the hole or orifice 32, the fixed orifice in the piston 12 and the disc valve 16, and generates a damping force in the contraction stroke as defined by the hole 32, the fixed orifice and the disc valve 15. The damping force is smaller than the first mentioned condition, and the damper is at a soft condition. When the switch 65 is switched the opposite ends of the series circuit consisting of LED 70 and the resistor 71 are connected so that LED 70 extinguishes. When the contact element 46 contacts the contact element 60, LED 72 is energized to emit light. The LED 72 indicates that the hydraulic damper 97 is set to the soft condition. Thereafter, the hydraulic damper 97 can easily be set to the hard condition by simply switching the switch 65 to the position shown in FIG. 5. The electric current supplied to the coil 44, through contact elements 60 and 46 and contact elements 47 and 61, rotates the rotor 43 in the direction indicated by arrow B.

It will be understood that the electric current energizing LED 70 or 72 flows through the coil 44 but the electric current is restricted by the resistors 71 or 73 to be sufficiently small so that any rotational torque is not generated on the rotor 43.

Although the description has been made with respect to one hydraulic damper and one rotary actuator, usually, four hydraulic dampers and four rotary actuators are incorporated in one automobile. FIG. 5 shows cables 80, 81 and 82 for three rotary actuators (not shown) associated with three other hydraulic dampers. Furthermore, the switch 65 described heretofore is a nonmementary type wherein the movable contact 83 is maintained in either one of the two extreme positions. However, the switch 65 may be of a momentary type wherein the movable contact 83 of the switch 65 returns to a neutral point 84 in a releasing operating force or pushing force. Thus, it is possible to indicate by LED 70 or LED 72 whether all four hydraulic dampers have been switched to the desired hard or soft condition from soft or hard condition.

As described heretofore, the rotary actuator according to the invention is simple in construction, reliable for rotating an object (the shutter 29 in the embodiment) between two predetermined angular positions, and reliable for indicating the operation of the rotary actuator.

What is claimed is:

1. A rotary actuator comprising:
   a casing;
   a rotor rotatably mounted in said casing for rotating in first and second opposite rotational directions in said casing;
   an exciting coil wrapped around said rotor;
   magnetic pole means in said casing extending around said rotor;
   a first contact element electrically connected to one end of said exciting coil;
   a second contact element electrically connected to the other end of said exciting coil;
   a third contact element electrically connected to said exciting coil intermediate said one end and said other end of said exciting coil;
   a first stop mounted within said casing for engaging said rotor to restrict said rotor from rotating in said first rotational direction past a first rotational position of said rotor;
   a second stop mounted within said casing for engaging said rotor to restrict said rotor from rotating in said second rotational direction past a second rotational position of said rotor;
   a fourth contact element mounted in said casing in electrical contact with said first contact element when said rotor is at said first rotational position and out of electrical contact with said first contact element when said rotor is at said second rotational position;
   a fifth contact element mounted within said casing in electrical contact with said second contact element when said rotor is in said second rotational position and out of electrical contact with said second contact element when said rotor is in said first rotational position; and
   a sixth contact element mounted within said casing in electrical contact with said third contact element when said rotor is in said first and said second rotational positions,
   said rotor being rotated in said first rotational direction when said fourth contact element is connected to one pole of an electric power source while said sixth contact elememt is connected to the other pole of the electric power source for causing current to flow in a first direction in said exciting coil thereby inducing a magnetic field which is acted upon by said magnetic pole means to rotate said rotor in said first rotational direction,
   said rotor being rotated in said second rotational direction when said fifth contact element is connected to said one pole of the electric power source while said sixth contact element is connected to said other pole of the electric power source for causing current to flow in a second direction in said exciting coil that is opposite to said first direction thereby inducing a magnetic field which is acted upon by said magnetic pole means to rotate said rotor in said second rotational direction.

2. A rotary actuator as claimed in claim 1 and further comprising,
   a switch for connecting said sixth contact element to said one pole of the electric power source and for selectively connecting said fourth and said fifth contact elements to said other pole of the electric power source.

3. A rotary actuator as claimed in claim 2 and further comprising,
an indicating means electrically coupled to said switch for indicating when said rotor is at said first rotational position and for indicating when said rotor is at said second rotational position.

4. A rotary actuator as claimed in claim 3 wherein, said indicating means comprises at least one light emitting diode.

5. A rotary actuator as claimed in claim 1 wherein,
said first contact element, said second contact element and said third contact element each comprise a spring-biased brush; and
said fourth contact element, said fifth contact element and said sixth contact element each comprise an arcuate slip ring.

* * * * *